US008894484B2

(12) United States Patent
Latta et al.

(10) Patent No.: US 8,894,484 B2
(45) Date of Patent: Nov. 25, 2014

(54) MULTIPLAYER GAME INVITATION SYSTEM

(75) Inventors: Stephen Latta, Seattle, WA (US); Kevin Geisner, Mercer Island, WA (US); Brian Mount, Seattle, WA (US); Jonathan Steed, Redmond, WA (US); Tony Ambrus, Seattle, WA (US); Arnulfo Zepeda, Kirkland, WA (US); Aaron Krauss, Snoqualmie, WA (US)

(73) Assignee: Microsoft Corporation, Redmond, WA (US)

( * ) Notice: Subject to any disclaimer, the term of this patent is extended or adjusted under 35 U.S.C. 154(b) by 427 days.

(21) Appl. No.: 13/361,798

(22) Filed: Jan. 30, 2012

(65) Prior Publication Data

US 2013/0196757 A1    Aug. 1, 2013

(51) Int. Cl.
*A63F 13/02*          (2006.01)
*A63F 13/12*          (2006.01)

(52) U.S. Cl.
USPC .............................................. 463/29; 463/36

(58) Field of Classification Search
CPC .................... A63F 2300/8082; A63F 2300/66; A63F 2300/6615; A63F 2300/6661; A63F 2300/6676; A63F 2300/5546; A63F 2300/5566; A63F 2300/572; A63F 2300/5533; A63F 2300/303; A63F 2300/1006; A63F 2300/1012; A63F 2300/1062; A63F 2300/1081; A63F 2300/1087; A63F 2300/1093
USPC ........... 463/30, 31, 32, 33, 34, 35, 29, 40, 41, 463/42, 36–39, 47
See application file for complete search history.

(56) References Cited

U.S. PATENT DOCUMENTS

| 6,807,562 | B1 | 10/2004 | Pennock et al. |
| 7,311,608 | B1 | 12/2007 | Danieli et al. |
| 2003/0125112 | A1 | 7/2003 | Silvester |
| 2005/0181878 | A1 | 8/2005 | Danieli et al. |
| 2006/0247046 | A1 | 11/2006 | Choi et al. |
| 2007/0190494 | A1 | 8/2007 | Rosenberg |
| 2007/0220108 | A1 | 9/2007 | Whitaker |
| 2008/0242421 | A1 | 10/2008 | Geisner et al. |

(Continued)

OTHER PUBLICATIONS

Zhan, et al., "A Real-Time Facial Expression Recognition System for Online Games", Retrieved at <<http://downloads.hindawi.com/journals/ijcgt/2008/542918.pdf>>, International Journal of Computer Games Technology, Jan. 2008, pp. 1-7.

(Continued)

*Primary Examiner* — David L Lewis
*Assistant Examiner* — Matthew D Hoel
(74) *Attorney, Agent, or Firm* — Micah Goldsmith; Leonard Smith; Micky Minhas

(57) ABSTRACT

A system and related methods for inviting a potential player to participate in a multiplayer game via a user head-mounted display device are provided. In one example, a potential player invitation program receives user voice data and determines that the user voice data is an invitation to participate in a multiplayer game. The program receives eye-tracking information, depth information, facial recognition information, potential player head-mounted display device information, and/or potential player voice data. The program associates the invitation with the potential player using the eye-tracking information, the depth information, the facial recognition information, the potential player head-mounted display device information, and/or the potential player voice data. The program matches a potential player account with the potential player. The program receives an acceptance response from the potential player, and joins the potential player account with a user account in participating in the multiplayer game.

20 Claims, 4 Drawing Sheets

(56) References Cited

U.S. PATENT DOCUMENTS

2009/0143141 A1 6/2009 Wells et al.
2010/0016069 A1 1/2010 Herrmann
2011/0102459 A1 5/2011 Hall
2011/0182481 A1 7/2011 Dernis et al.

OTHER PUBLICATIONS

ISA Korea, International Search Report and Written Opinion of PCT/US2013/023692, May 15, 2013, WIPO, 10 pages.

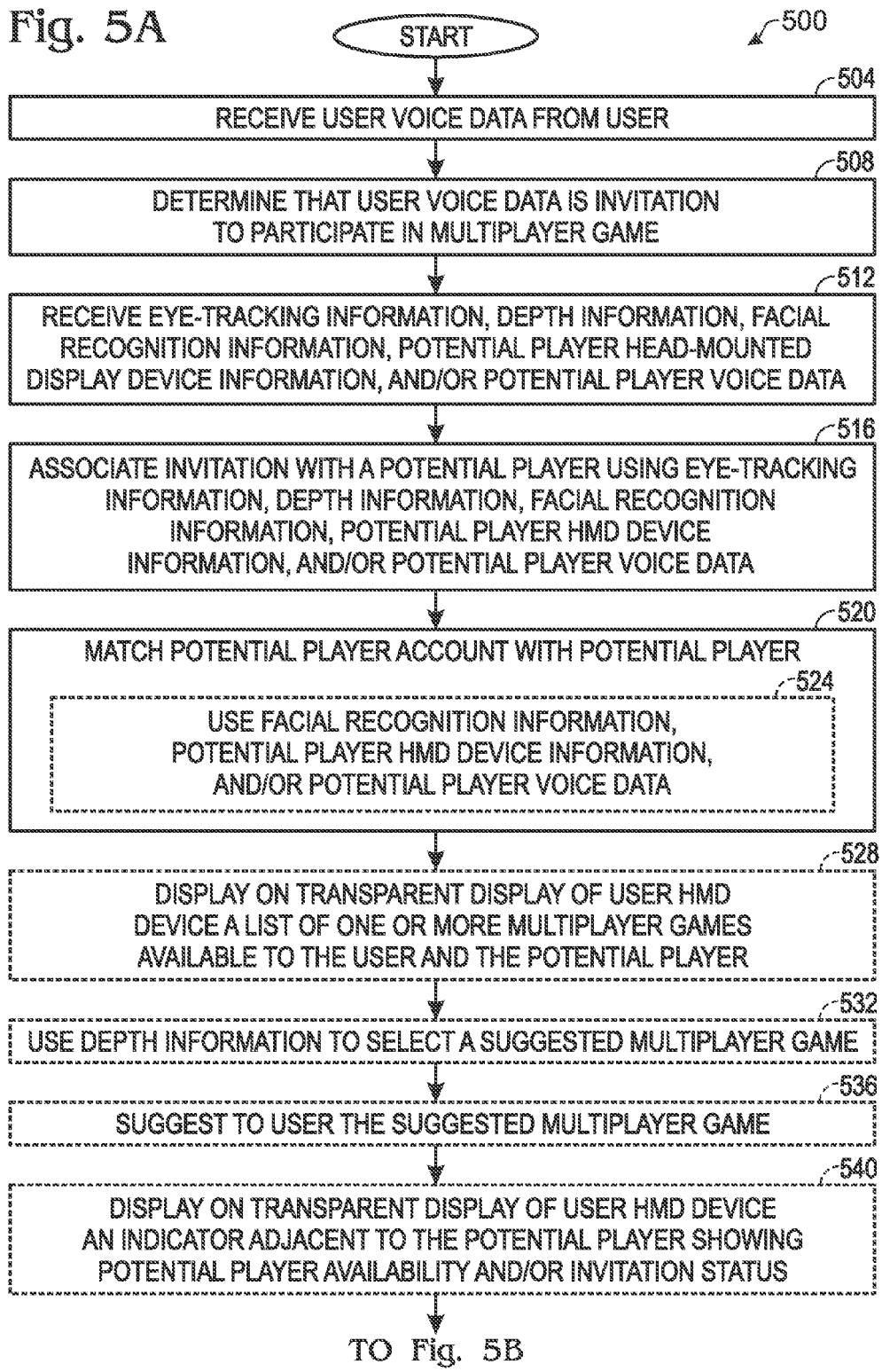

MULTIPLAYER GAME INVITATION SYSTEM

BACKGROUND

Online multiplayer games are typically played across multiple hardware devices in various locations. Such games may associate a particular user to a hardware device via an abstraction, and make a connection through the abstraction to the device. Additionally, some multiplayer games may be played through a hardware device, such as a gaming console, that is typically located in a fixed location, such as an entertainment room in a home.

To invite others to join a multiplayer game, a user may access and work through a menu system with his or her hardware device to send an invitation to another player. Using such a menu system may be time-consuming and may involve the user focusing on the tasks associated with sending an invitation. Such a menu system may also offer a stilted and limited user experience that discourages a user from making spontaneous invitations. Additionally, if the user is actively playing a multiplayer game, using such a menu system to send invitations mid-game may take the user away from the game action. Further, where the user's hardware device is located in a fixed location, the user's ability to make face-to-face invitations in other locations may also be limited.

SUMMARY

To address the above issues, a multiplayer game invitation system including a user head-mounted display device and related methods for inviting a potential player to participate in a multiplayer game are provided. In one example, a method may include receiving user voice data from a user and determining that the user voice data is an invitation to participate in a multiplayer game. Eye-tracking information, depth information, facial recognition information, potential player head-mounted display device information, and/or potential player voice data may be received. The invitation from the user may be associated with the potential player using the eye-tracking information, the depth information, the facial recognition information, the potential player head-mounted display device information, and/or the potential player voice data.

The method may include matching a potential player account with the potential player. The method may further include receiving an acceptance response from the potential player, and joining the potential player account with a user account associated with the user in participating in the multiplayer game.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 5A and 5B are a flow chart of a method for inviting a potential player to participate in a multiplayer game according to an embodiment of the present disclosure.

DETAILED DESCRIPTION

Figure 1:
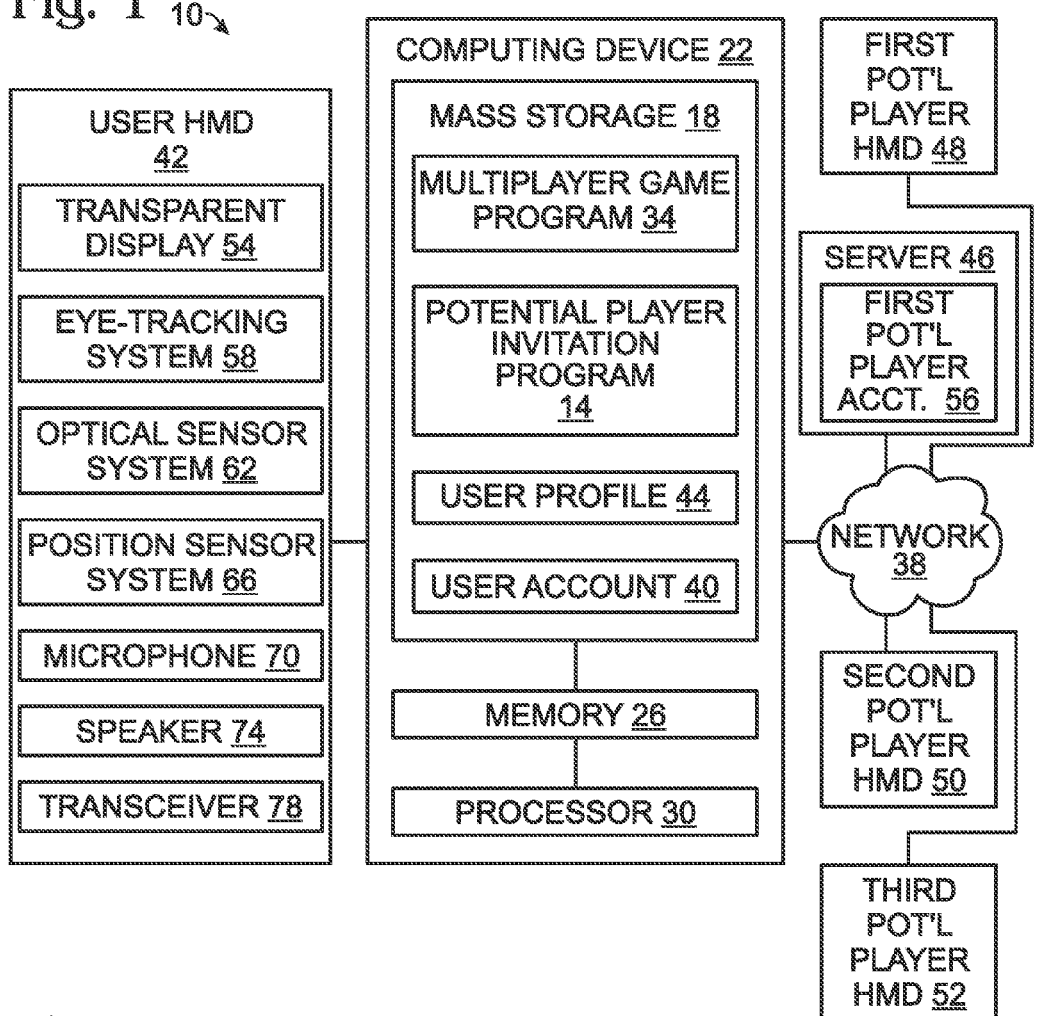
FIG. 1 is a schematic view of a multiplayer game invitation system according to an embodiment of the present disclosure.

FIG. 1 shows a schematic view of one embodiment of a multiplayer game invitation system 10 for visually augmenting an appearance of an interaction environment as seen through a display in a head-mounted display (HMD) device. The multiplayer game invitation system 10 includes a potential player invitation program 14 that may be stored in mass storage 18 of a computing device 22. The potential player invitation program 14 may be loaded into memory 26 and executed by a processor 30 of the computing device 22 to perform one or more of the methods and processes described in more detail below.

In one example, the multiplayer game invitation system 10 may also include a multiplayer game program 34 that may be stored in mass storage 18 of the computing device 22. The multiplayer game program 34 may generate a game in the form of a video game, augmented or virtual reality game or experience, or any other suitable electronic game or experience that involves interaction among two or more participants. In another example, the multiplayer game program 34 may be stored remotely and may be accessed by the computing device 22 over a network 38 to which the computing device is operatively connected.

A user account 40 corresponding to a particular user may also be stored in the mass storage 18 of the computing device 22. The user account 40 may include, for example, a user's account information for one or more online games and/or gaming services. Such information may include, for example, games that the user has purchased, installed, and/or validated, as well as usage data regarding games the user has played. It will be appreciated that the user account 40 may also serve as an abstraction that is associated with the particular user. Such an abstraction may be further associated with a particular hardware device, such as the user head-mounted display (HMD) device 42 described in more detail below, upon proper authentication of the particular user via the hardware device.

A user profile 44 corresponding to a particular user may also be stored in the mass storage 18 of the computing device 22, either separately or as part of the user account 40. The user profile 44 may include, for example, a user name, a user ID, one or more game achievement levels corresponding to levels of proficiency attained by the user on certain games, game interests of the user, games purchased and/or available to the user, and/or any other user-related information that the user may choose to store in the user profile. It will also be appreciated that in other examples the user account 40 and/or user profile 44 may be stored remotely, such as on a remote server 46 accessed via network 38.

The computing device 22 may take the form of a desktop computing device, a mobile computing device such as a smart phone, laptop, notebook or tablet computer, network computer, home entertainment computer, interactive television, gaming system, or other suitable type of computing device. Additional details regarding the components and computing aspects of the computing device 22 are described in more detail below with reference to FIG. 6.

The computing device 22 may be operatively connected with the user HMD device 42 using a wired connection, or may employ a wireless connection via WiFi, Bluetooth, or any other suitable wireless communication protocol. Additionally, the example illustrated in FIG. 1 shows the computing device 22 as a separate component from the user HMD device 42. It will be appreciated that in other examples the computing device 22 may be integrated into the user HMD device 42.

The computing device 22 also may be operatively connected with one or more additional HMD devices, such as first potential player HMD device 48, second potential player HMD device 50, and third potential player HMD device 52. In one example, the computing device 22 may communicate with the first potential player HMD device 48, second potential player HMD device 50, and third potential player HMD device 52 via network 38. Network 38 may take the form of a local area network (LAN), wide area network (WAN), wired network, wireless network, personal area network, or a combination thereof, and may include the Internet. Additionally, a remote server such as server 46 may include a first potential player account 56 and one or more additional accounts associated with additional potential player(s).

Figure 2:
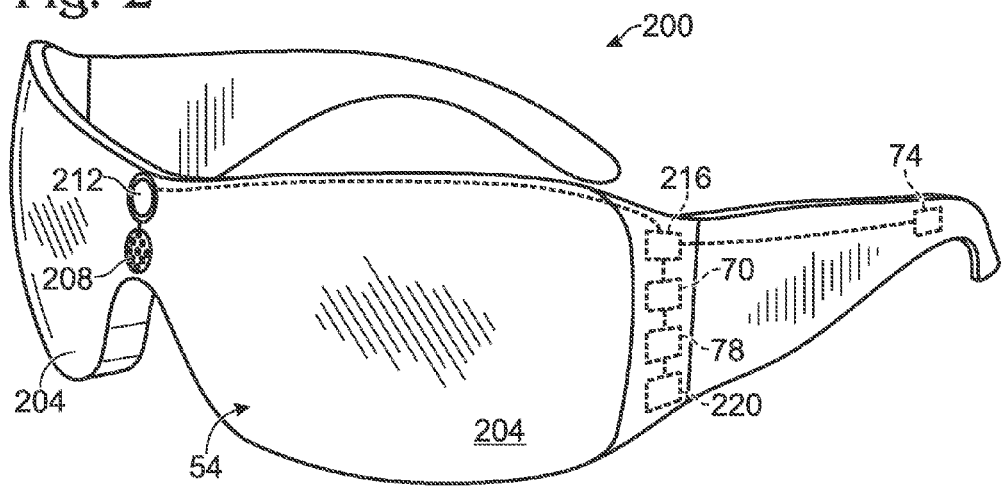
FIG. 2 shows an example head-mounted display device according to an embodiment of the present disclosure.

FIG. 2 shows an example of an HMD device 200 in the form of a pair of wearable glasses that include a transparent display 54. In other examples, the HMD device 200 may take other suitable forms in which a transparent, semi-transparent or non-transparent display is supported in front of a viewer's eye or eyes. It will be appreciated that the user HMD device 42, first potential player HMD device 48, second potential player HMD device 50, and third potential player HMD device 52 may take the form of the HMD device 200, as described in more detail below, or any other suitable HMD device.

With reference to FIGS. 1 and 2, in this example the HMD device 200 includes a transparent display 54 that enables images to be delivered to the eyes of a user. The transparent display 54 may be configured to visually augment an appearance of a physical environment to a user viewing the physical environment through the transparent display. For example, the appearance of the physical environment may be augmented by graphical content (e.g., one or more pixels each having a respective color and brightness) that is presented via the transparent display 54.

The transparent display 54 may be configured to enable a user to view a real-world object in the physical environment through one or more partially transparent pixels that are displaying a virtual object representation. In one example, the transparent display 54 may include image-producing elements located within lenses 204 (such as, for example, a see-through Organic Light-Emitting Diode (OLED) display). As another example, the transparent display 54 may include a light modulator on an edge of the lenses 204. In this example, the lenses 204 may serve as a light guide for delivering light from the light modulator to the eyes of a user.

In other examples, transparent display 54 may support selective filtering of light received from the physical environment before reaching an eye of a user wearing the HMD device 200. Such filtering may be performed on a pixel-by-pixel basis or on groups of pixels. As one example, the selective filtering or removal of ambient light may be supported by the transparent display 54 at a different resolution (e.g., a lower resolution or a higher resolution) than the resolution supported by the transparent display for the presentation of lighted graphical content (e.g., illuminated pixels). In other examples, transparent display 54 may include a first display layer that adds light in the form of one or more illuminated pixels, and a second display layer that filters ambient light received from the physical environment. These layers may have different display resolution, pixel density, and/or display capabilities.

The HMD device 200 may also include various systems and sensors. For example, the HMD device 200 may include an eye-tracking system 58 that utilizes at least one inward facing sensor 208. The inward facing sensor 208 may be an image sensor that is configured to acquire image data in the form of eye-tracking information from a user's eyes. Provided the user has consented to the acquisition and use of this information, the eye-tracking system 58 may use this information to track the position and/or movement of the user's eyes. The eye-tracking system 58 may then determine where and/or at what person or object the user is looking. In another example, the inward facing sensor 208 may capture retinal scan information from a user's retina. Provided the user has consented to the acquisition and use of this information, such information may be used to identify the user wearing the HMD device 200.

The HMD device 200 may also include an optical sensor system 62 that utilizes at least one outward facing sensor 212, such as an optical sensor. Outward facing sensor 212 may detect movements within its field of view, such as gesture-based inputs or other movements performed by a user or by a person within the field of view. Outward facing sensor 212 may also capture image information, such as facial recognition information, and depth information from a physical environment and real-world objects within the environment. For example, outward facing sensor 212 may include a depth camera, a visible light camera, an infrared light camera, and/or a position tracking camera. In some examples, outward facing sensor 212 may include one or more optical sensors for observing visible spectrum and/or infrared light from the ambient lighting conditions in the physical environment.

In other examples, the HMD device 200 may include facial recognition capabilities via one or more still or video cameras. To detect a facial image of a person, the HMD device 200 and/or computing device 22 may use any suitable face detection technologies and/or algorithms including, but not limited to, local binary patterns (LBP), principal component analysis (PCA), independent component analysis (ICA), evolutionary pursuit (EP), Elastic Bunch Graph Matching (EBGM), or other suitable algorithm or combination of algorithms.

As noted above, the HMD device 200 may include depth sensing via one or more depth cameras. Time-resolved images from one or more of these depth cameras may be registered to each other and/or to images from another optical sensor such as a visible spectrum camera, and may be combined to yield depth-resolved video.

In some examples, a depth camera may take the form of a structured light depth camera configured to project a structured infrared illumination comprising numerous, discrete features (e.g., lines or points). The depth camera may be configured to image the structured illumination reflected from a scene onto which the structured illumination is projected. A depth map of the scene may be constructed based on spacings between adjacent features in the various regions of an imaged scene.

In other examples, a depth camera may take the form of a time-of-flight depth camera configured to project a pulsed infrared illumination onto a scene. This depth camera may be configured to detect the pulsed illumination reflected from the scene. Two or more of these depth cameras may include electronic shutters synchronized to the pulsed illumination. The integration times for the two or more depth cameras may differ, such that a pixel-resolved time-of-flight of the pulsed illumination, from the source to the scene and then to the depth cameras, is discernible from the relative amounts of light received in corresponding pixels of the two depth cameras. The HMD device 200 may also include an infrared projector to assist in structured light and/or time of flight depth analysis.

In other examples, gesture-based and other motion inputs from the user and/or persons in the physical environment may also be detected via one or more depth cameras. For example, outward facing sensor 212 may include two or more optical sensors with known relative positions for creating depth images. Using motion results from these optical sensors with known relative positions, such depth images may evolve over time.

Figure 3:
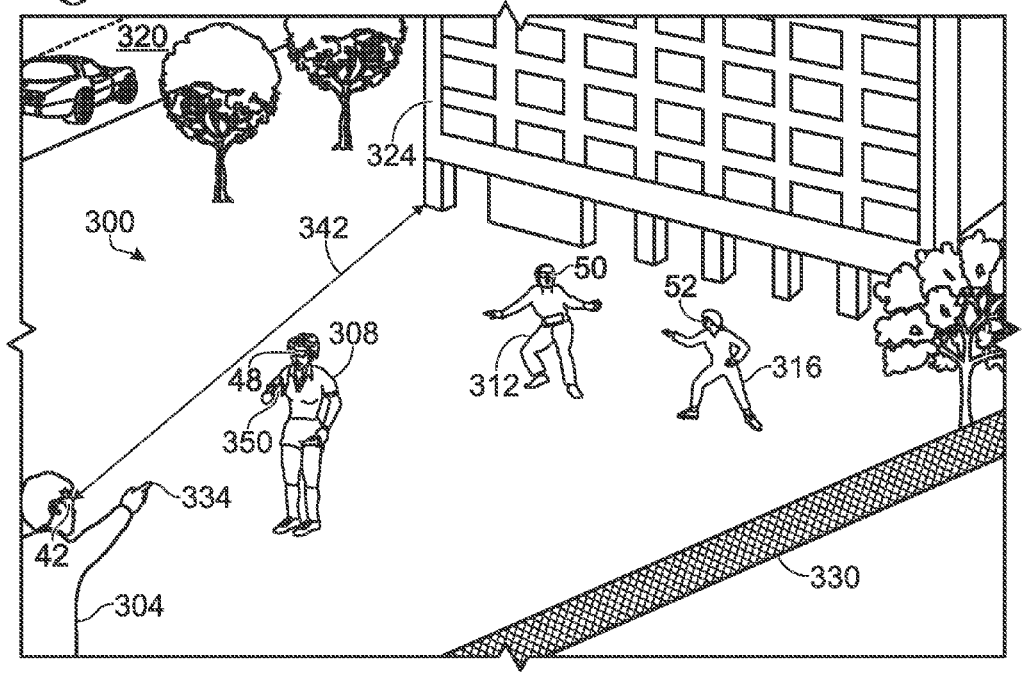
FIG. 3 is a schematic view of a user in an interaction space using the multiplayer game invitation system of FIG. 1 according to an embodiment of the present disclosure.

Outward facing sensor 212 may capture images of a physical environment, such as the interaction space 300 shown in FIG. 3, which may be provided as input to the potential player invitation program 14 and/or multiplayer game program 34. In one example, the multiplayer game program 34 may include a 3D modeling system that uses such input to generate a virtual environment that models the physical environment that is captured.

The HMD device 200 may also include a position sensor system 66 that utilizes on or more motion sensors 216 to enable position tracking and/or orientation sensing of the HMD device, and determine a position of the HMD device within a physical environment. As one example, position sensor system 66 may be configured as a six-axis or six-degree of freedom position sensor system. This example position sensor system may, for example, include three accelerometers and three gyroscopes to indicate or measure a change in location of the HMD device 200 within three-dimensional space along three orthogonal axes (e.g., x, y, z), and a change in an orientation of the HMD device about the three orthogonal axes (e.g., roll, pitch, yaw).

Position sensor system 66 may support other suitable positioning techniques, such as GPS or other global navigation systems. For example, position sensor system 66 may include a wireless receiver (e.g., a GPS receiver or cellular receiver) to receive wireless signals broadcast from satellites and/or terrestrial base stations. These wireless signals may be used to identify a geographic location of the HMD device 200.

Positioning information obtained from wireless signals received by the HMD device 200 may be combined with positioning information obtained from the motion sensors 216 to provide an indication of location and/or orientation of the HMD device 200. While specific examples of position sensor systems have been described, it will be appreciated that other suitable position sensor systems may be used.

Motion sensors 216 may also be employed as user input devices, such that a user may interact with the HMD device 200 via gestures of the neck and head, or even of the body. Non-limiting examples of motion sensors include an accelerometer, a gyroscope, a compass, and an orientation sensor, which may be included as any combination or subcombination thereof.

The HMD device 200 may also include one or more microphones 70. In some examples, and as described in more detail below, microphones 70 may receive audio input from a user and/or audio input from one or more persons in a physical environment around the user. Such audio input may include, for example, commands, requests, casual speaking, singing, whistling, etc. Additionally or alternatively, one or more microphones separate from the HMD device 200 may be used to receive audio input.

In other examples, audio may be presented to the user via one or more speakers 74 on the HMD device 200. Such audio may include, for example, music, instructions, and/or other communication from the multiplayer game program 34, the potential player invitation program 14, or other sources.

In other examples, the HMD device 200 may also include a transceiver 78 for broadcasting wireless signals such as Wi-Fi signals, Bluetooth signals, etc., and receiving such signals from other devices, These wireless signals may be used, for example, to exchange data and/or create networks among devices.

It will be understood that the sensors and other components described above and illustrated in FIG. 2 are shown by way of example. These examples are not intended to be limiting in any manner, as any other suitable sensors, components, and/or combination of sensors and components may be utilized.

The HMD device 200 may also include a controller 220 having a logic subsystem and a data-holding subsystem, discussed in more detail below with respect to FIG. 6, that are in communication with the various input and output devices of the HMD device. Briefly, the data-holding subsystem may include instructions that are executable by the logic subsystem, for example, to receive and forward inputs from the sensors to computing device 22 (in unprocessed or processed form) via a communications subsystem, and to present images to the user via the transparent display 54.

It will be appreciated that the HMD device 200 described above is provided by way of example, and thus is not meant to be limiting. Therefore it is to be understood that the HMD device 200 may include additional and/or alternative sensors, cameras, microphones, input devices, output devices, etc. without departing from the scope of this disclosure. Further, the physical configuration of an HMD device 200 and its various sensors and subcomponents may take a variety of different forms without departing from the scope of this disclosure.

Figure 4:
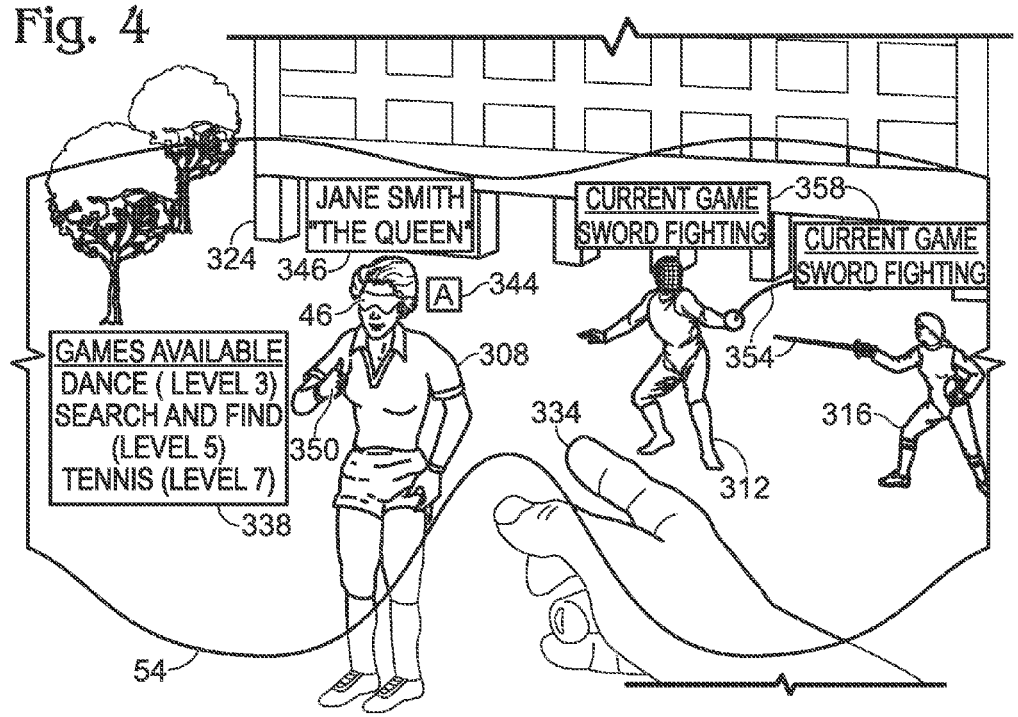
FIG. 4 is a schematic view of the interaction space of FIG. 3 as seen through the transparent display of the head-mounted display device worn by the user.

With reference now to FIGS. 3 and 4, a description of interactions among user 304, first potential player 308, second potential player 312, and third potential player 316 via one example of the multiplayer game invitation system 10 will now be provided. FIG. 3 is a schematic view of a user 304 standing in a physical interaction space 300, which in this example is an urban plaza bounded by a street 320, a building 324, and a fence 330.

With reference also to FIG. 1, the user 304 may wear the user HMD device 42 that includes the transparent display 54 through which the user may view the interaction space 300. Similarly, first potential player 308 may wear the first potential player HMD device 48, second potential player 312 may wear the second potential player HMD device 50, and third potential player 316 may wear the third potential player HMD device 52.

FIG. 4 is a schematic view of the interaction space 300 of FIG. 3 as seen through the transparent display 54 of the user HMD device 42 worn by the user 304. Using one or more of the sensors described above, the user HMD device 42 may receive optical information, position information, depth information, audio information, and/or other information corresponding to the interaction space 300, the user 304, first potential player 308, second potential player 312, and/or third potential player 316. As described above, the user HMD device 42 may also receive data from the network 38, first potential player HMD device 48, second potential player HMD device 50 and/or third potential player HMD device 52. As described in more detail below, the potential player invitation program 14 may use this information and/or data to aid the user 304 in inviting one or more potential players to participate in a multiplayer game with the user.

In one example, the user 304 may desire to invite the first potential player 308 to participate in a multiplayer game. The user 304 may look at the first potential player 308 and say, "Hey, wanna play a game?" The potential player invitation program 14 may receive the user's voice data via the microphone 70.

The potential player invitation program 14 may use speech recognition to analyze the user's voice data and determine that the voice data is an invitation to participate in a multiplayer game. For example, the potential player invitation program 14 may identify and interpret key words, such as "wanna", "play" and "game," that suggest an invitation from the user 304. In this manner, the user 304 may use natural, colloquial language to invite the first potential player 308 to play a game. It will be appreciated that other words and forms of a verbal invitation from the user 304 may be identified as an invitation ("Would you like to join me in a game?", "Are you interested in playing virtual tennis?", etc.).

In one example, the user 304 may desire to invite the first potential player 308 to participate in an active multiplayer game in which the user 304 is currently participating. Advantageously, the potential player invitation program 14 enables the user 304 to use natural language and easily provide an invitation to the first potential player 308 with minimal interruption to the user in the active multiplayer game. Additionally, and as explained in more detail below, providing an invitation may trigger an exchange of data between the first potential player HMD device 48 and the user's multiplayer game invitation system 10 that may facilitate the user 304 and the first potential player 308 participating in a multiplayer game.

The user HMD device 42 may receive one or more of the various forms of input and information described above. Using such information and input, the potential player invitation program 14 may associate the user's invitation with an appropriate recipient. For example, the eye-tracking system 58 may provide eye-tracking information that shows that the user 304 is looking at the first potential player 308 as the user says, "Hey, would you like to play a game?" In another example, the optical sensor system 62 may provide depth information indicating that the first potential player 308 is closer to the user 304 than the second potential player 312 or the third potential player 316, when the user speaks the invitation. Similarly, the position sensor system 66 may provide position information indicating that the first potential player 308 is closer to the user 304 than the second potential player 312 or the third potential player 316.

In another example, the optical sensor system 62 may use depth information to detect that the user 304 is gesturing toward the first potential player 308. For example, and with reference to FIGS. 3 and 4, the user 304 may point at the first potential player 308 with the user's right index finger 334 as the user speaks the invitation. A depth camera may provide depth information that shows that the user 304 is pointing at the first potential player 308.

It will be appreciated that the above examples of information and input, used individually or in various combinations, may be used to associate the user's invitation with the first potential player 308. It will also be appreciated that one or more other forms of information and/or input received by the user HMD device 42 may also be used to associate the invitation with the first potential player 308.

With the user's invitation associated with the first potential player 308, the potential player invitation program 14 may match the first potential player 308 to a potential player account, such as first potential player account 56. In one example, the potential player invitation program 14 may use facial recognition information received from the optical sensor system 62 in the user HMD device 42 to match the first potential player 308 with the first potential player account 56.

In another example, the potential player invitation program 14 may use information broadcast by the first potential player HMD device 48 to match the first potential player 308 with the first potential player account 56. For example, the first potential player 308 may choose to broadcast from the first potential player HMD device 48 data that allows selected other devices to link the first potential player 308 with the first potential player account 56. Such data may be received by the user HMD device 42 and used to match the first potential player 308 with the first potential player account 56.

In another example, the potential player invitation program 14 may use voice data received from the first potential player 308 to match the first potential player with the first potential player account 56. For example, the potential player invitation program 14 may use speech recognition to analyze speech patterns in the first potential player voice data, and match the first potential player 308 with the first potential player account 56.

The potential player invitation program 14 may also determine from the user account 40 what multiplayer games the user 304 has available to play. Similarly, the potential player invitation program 14 may determine from the first potential player account 56 what multiplayer games the first potential player 308 has available to play. Using this information, the potential player invitation program 14 may help the user 304 select an appropriate game to play with potential player 308.

In one example, the potential player invitation program 14 may display on the transparent display 54 of the user HMD device 42 a "Games Available" list 338 adjacent to the first potential player 308 that shows the multiplayer games that are available to both the user 304 and first potential player. In another example, the potential player invitation program 14 may provide additional information related to the available games that may be of interest to the user 304. For example, the "Games Available" list 338 may also include a game achievement level next to each game that indicates the highest level achieved by the user 304 or by the potential player 308 in each of the games. In other examples, the game achievement level may indicate the highest level achieved by both the potential player 308 and the user 304.

In another example, the potential player invitation program 14 may provide audio through the speaker 74 that informs the user of the multiplayer games and possible related additional information that are available to both the user 304 and the first potential player 308.

In another example and as discussed above, the potential player invitation program 14 may receive depth information that corresponds to surfaces, objects, and other forms within the interaction space 300. With reference to FIG. 3, an example of such depth information is shown as a measured depth 342 from the user HMD device 42 to the building 324 across the plaza from the user 304. In some examples, additional measured depths corresponding to other surfaces, objects, and other forms within interaction space 300 may be used to construct a virtual representation of the interaction space 300.

The potential player invitation program 14 may use one or more measured depths of the interaction space 300 to select a suggested multiplayer game that is physically compatible with the interaction space. For example and with reference to FIG. 3, the potential player invitation program 14 may select games that are suitable for spaces bounded by a structure at a measured depth 342. Accordingly, the potential player invitation program 14 may select a Dance game, a Search And Find game, and a Tennis game that each may be comfortably played within the interaction space 300.

In another example, the potential player invitation program 14 may suggest the suggested games to the user 304 via the transparent display 54. For example, in the "Games Available" list 338 each of the Dance, Search And Find and Tennis games may be highlighted, colored, or otherwise emphasized to indicate that they are suggested games. In another example, where another game may be available but not suggested, that game may be listed in the "Games Available" list 338 but not emphasized.

In still another example, the user 304 and/or potential player 308 may mention a particular game in conversation. If the user 304 offers an invitation to the potential player 308, then this game may be listed and/or emphasized in the "Games Available" list 338. For example, the user 304 may say to the potential player 308, "Hey, I love Tennis." The potential player 308 may respond, "Yeah, me too." The user 304 may reply "Great! Let's play!" The potential player invitation program 14 may determine that the reply of the user 304 is an invitation to the potential player 308 to participate in the game Tennis. The potential player invitation program 14 may then list and/or emphasize the game Tennis in the "Games Available" list 338.

It will be also appreciated that the potential player invitation program 14 may use other information and input provided by the user HMD device 42, such as ambient lighting information from the optical sensor system 62, to select a suggested multiplayer game that is compatible with the interaction space 300.

In another example, the potential player invitation program 14 may display on the transparent display 54 of the user HMD device 42 an indicator in the form of a floating tag 344 adjacent to the first potential player 308. In one example, such as prior to the user 304 providing an invitation to the first potential player 308, the floating tag 344 may indicate an availability of the first potential player for playing a multiplayer game. The floating tag 344 may include a letter or symbol that corresponds to an availability status of the first potential player 308—for example, the letter "A" may indicate available and the letter "U" may indicate unavailable. In another example, the floating tag 344 may have a color that corresponds to an availability status—for example, green may indicate available and red may indicated unavailable.

In another example, such as after the user 304 has given an invitation to play a multiplayer game to the first potential player 308, the floating tag 344 may indicate an invitation status of the invitation. The floating tag 344 may include a letter or symbol that corresponds to an invitation status—for example, the letter "P" may indicate the invitation is pending, the letter "A" may indicate the invitation has been accepted, and the letter "D" may indicate the invitation has been declined. In another example, the floating tag 344 may have a color that corresponds to an availability status—for example, green may indicate accepted, yellow may indicate pending, and red may indicate declined.

In another example, the potential player invitation program 14 may display on the transparent display 54 of the user HMD device 42 profile information 346 that is made available by the first potential player 308. In one example, the profile information 346 may include a name of the first potential player 308, a user ID, a game achievement level on one or more games, game interests of the first potential player, and/or or other information related to the first potential player.

It will be appreciated that the user 304 and first potential player 308 may select privacy settings that control the types and amounts of profile and other information that is shared or made available to others via the potential player invitation program 14. In one example, prior to an invitation being received by the first potential player 308, the first potential player may choose to share no information with others. If an invitation is received, the first potential player 308 may share limited information, such as a name, user ID and a game achievement level, with the user 304 who provided the invitation. After the first potential player 308 accepts the invitation, the first potential player may share additional information with the user 304, such as other game interests.

After the user 304 has made the invitation, the first potential player invitation program 14 may receive an acceptance response from the first potential player 308. In one example, the first potential player 308 may respond to the invitation by saying, "Yeah, sure." The potential player invitation program 14 may receive the user's voice data via the user HMD device 42 and microphone 70, and may use speech recognition to analyze the voice data and determine that the voice data is an acceptance to the invitation. It will be appreciated that other vocal responses, such as "Yes", "I'd love to", etc., may be used to indicate an acceptance.

In another example, the first potential player 308 may respond to the invitation by performing a gesture. For example, the first potential player 308 may accept the invitation by making a thumbs-up gesture with her right hand 350. A depth camera in the optical sensor system 62 of the user HMD device 42 may detect the thumbs-up gesture, and the potential player invitation program 14 may interpret the gesture as an acceptance of the invitation. It will be appreciated that other gestures or movements made by the first potential player 308, such as nodding her head up and down, may be received and interpreted as an acceptance of the invitation.

Upon receiving an acceptance response from the first potential player 308, the potential player invitation program 14 may join the first potential player account 56 with the user account 40 in participating in a multiplayer game. In one example, the user 304 may ask the first potential player 308, "How about a game of Dance?" When the first potential player 308 responds affirmatively, the potential player invitation program 14 may initiate a game of Dance that includes the user account 40 and the first potential player account 56.

In other examples, the user 304 may desire to delineate two or more teams of players for a multiplayer game. For example, in the context of a mixed-doubles tennis game, the user 304 may say, "Jane (first potential player 308) and I are one team, and Bjorn (second potential player 312) and Chrissie (third potential player 316) are the other team." In these examples, the potential player invitation program 14 may use voice recognition, eye-tracking information, and other inputs from the user HMD device 42 to create the two teams desired by the user 304.

In other examples, the user 304 may make a multiple-person invitation. For example, the user 304 may look at a cluster of people and say, "Would you all like to play?" The user 304 may also make a gesture directed at the cluster of people while speaking an invitation, such as "You want to play?" Such a gesture may include pointing at and/or sweeping across the cluster of people, pointing to each person in rapid succession, nodding toward the cluster of people, and any other gesture directed at the cluster of people. The potential player invitation program 14 may use voice recognition, eye-tracking information, depth information, and/or other inputs from the user HMD device 42 to determine that the words and any gestures of the user 304 are an invitation to play a game, and to associate the invitation with each of the people in the cluster of people.

In still another example, the user 304 may observe one or more other potential players who are currently participating in an active multiplayer game. For example, and with continued reference to FIGS. 3 and 4, the second potential player 312 and the third potential player 316 may be currently participating in an active multiplayer game of Sword Fighting. As shown in FIG. 4, the transparent display 54 of the user HMD device 42 may display one or more images that correspond to virtual object representations used in the active Sword Fighting game, such as swords 354. The transparent display 54 may also display information related to the active game being played by the second potential player 312 and the third potential player 316. In one example, a dialog box 358 indicating the active game being played may be displayed above the head of the second potential player 312 and the third potential player 316.

In one example, the user 304 may be permitted to see the dialog box 358 and/or swords 354 if the user account 40 and/or user profile 44 includes sufficient privileges related to the second potential player 312 and third potential player 316. For example, where the user 304 is "friends" with the second potential player 312 and third potential player 316 via a social networking service, the user 304 may be permitted to see the swords 354 via the transparent display 54. In another example, the second potential player 312 and third potential player 316 may specifically grant permission to the user 304 to see games these players are playing.

The user 304 may desire to join the currently-participating second potential player 312 and third potential player 316 in their active multiplayer game of Sword Fighting. In one example, the user 304 may ask the second potential player 312, "Hey, can I play too?" The potential player invitation program 14 may receive the user voice data and determine that it is a request to join the second potential player 312 in participating in the Sword Fighting game. The second potential player 312 may provide an acceptance response, such as saying, "Yeah, sure." Upon receiving an acceptance response from the second potential player 312, the potential player invitation program 14 may join the user account 40 with an account associated with the second potential player 312 in participating in the Sword Fighting game.

In another example, the second potential player 312 or the third potential player 316 may invite the user 304 to participate in their active multiplayer game of Sword Fighting. If the user 304 accepts the invitation, the user account 40 may be joined with an account associated with the second potential player 312 and third potential player 316 in participating in the Sword Fighting game.

While participating in a multiplayer game, such as Dance with the first potential player 308, the user 304 may desire to stop playing the game. In one example, the user 304 may speak his intention to stop playing the game, such as by saying, "I'm done", "Thanks everyone, I'm finished", or other words indicating that the user is exiting the game. Upon receiving the user's voice data from the user HMD device 42, the potential player invitation program 14 may determine that the user voice data is a command to exit the multiplayer game. The potential player invitation program 14 may then remove the user account 40 from participation in the multiplayer game.

Figure 5B:
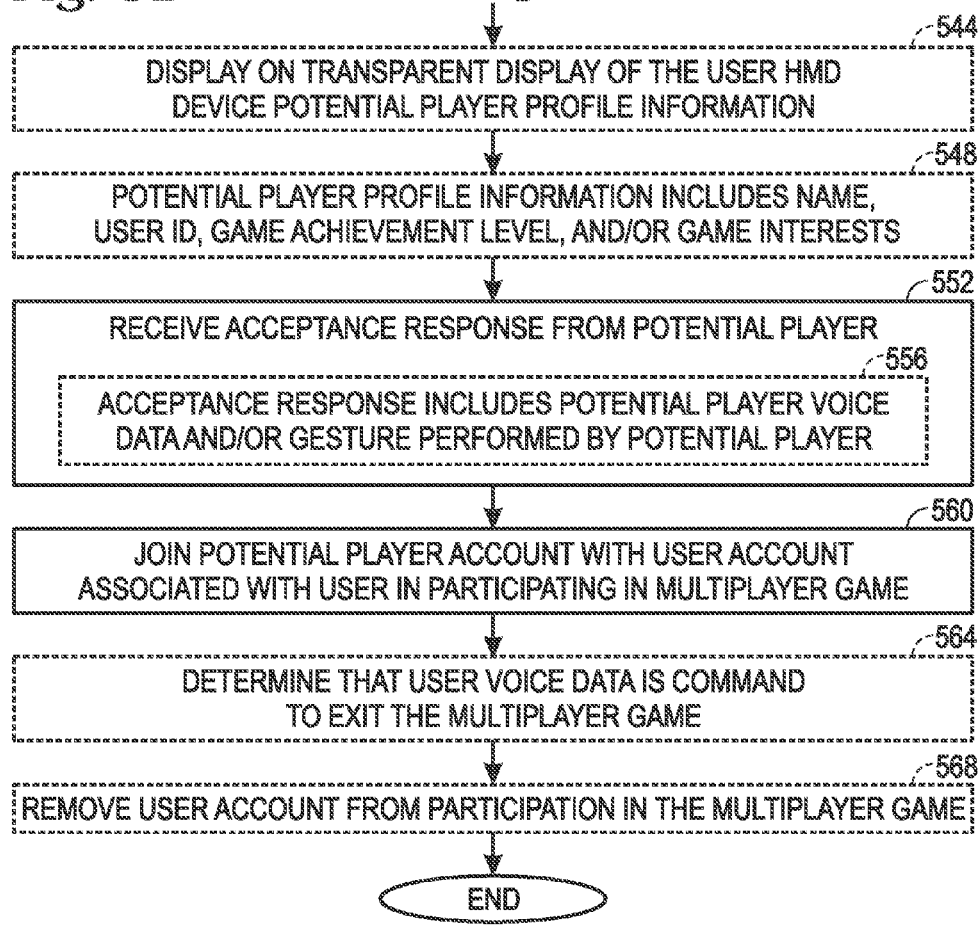

FIGS. 5A and 5B illustrate a flow chart of a method 500 for inviting a potential player to participate in a multiplayer game with a user according to an embodiment of the present disclosure. The following description of method 500 is provided with reference to the software and hardware components of the multiplayer game invitation system 10 described above and shown in FIGS. 1-4. It will be appreciated that method 500 may also be performed in other contexts using other suitable hardware and software components.

With reference to FIG. 5A, at 504 the method may include receiving user voice data from the user 304. At 508 the method 500 may include determining that the user voice data is an invitation to participate in a multiplayer game. At 512 the method 500 may further include receiving from the user HMD device 42 eye-tracking information, depth information, facial recognition information, potential player HMD device information, and/or potential player voice data.

At 516 the method 500 may include associating the invitation from the user 304 with a potential player using the eye-tracking information, the depth information, the facial recognition information, the potential player HMD device information, and/or the potential player voice data. At 520 the method 500 may include matching a potential player account with the potential player. In one example, at 524 the method may include using the facial recognition information, the potential player head-mounted display device information, and/or the potential player voice data to match the potential player account with the potential player.

In one example, at 528 the method 500 may include displaying on the transparent display 54 of the user HMD device 42 a list of one or more multiplayer games available to the user 304 and the potential player. In another example, the depth information received by the user HMD device 42 may include a measured depth of an interaction space in which the user 304 and the potential player are located. In this example, at 532 the method 500 may include using the depth information to select a suggested multiplayer game that is physically compatible with the measured depth of the interaction space. At 536, the method 500 may include suggesting to the user the suggested multiplayer game.

At 540 the method 500 may include displaying on the transparent display 54 of the user HMD device 42 an indicator adjacent to the potential player showing a potential player availability and/or an invitation status. With reference now to FIG. 5B, at 544 the method 500 may include displaying on the transparent display 54 of the user HMD device 42 potential player profile information. At 548, the potential player profile information may include a name, a user ID, a game achievement level, and/or game interests of the potential player. At 552 the method 500 may include receiving an acceptance response from the potential player. In one example, at 556 the acceptance response may comprise the potential player voice data and/or a gesture performed by the potential player. At 560, the method may include joining the potential player account with a user account associated with the user in participating in the multiplayer game.

At 564 the method 500 may include determining that the user voice data is a command to exit the multiplayer game. And at 568, the method 500 may include removing the user account from participation in the multiplayer game.

Figure 6:
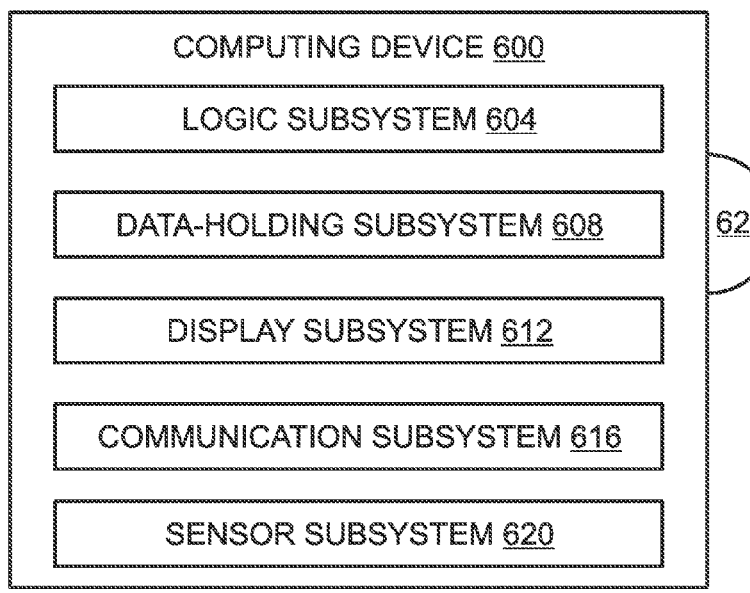
FIG. 6 is a simplified schematic illustration of an embodiment of a computing device.

FIG. 6 schematically shows a nonlimiting embodiment of a computing device 600 that may perform one or more of the above described methods and processes. Computing device 600 is shown in simplified form. It is to be understood that virtually any computer architecture may be used without departing from the scope of this disclosure. In different embodiments, computing device 600 may take the form of a mainframe computer, server computer, desktop computer, laptop computer, tablet computer, home entertainment computer, network computing device, mobile computing device, mobile communication device, gaming device, etc.

As shown in FIG. 6, computing device 600 includes a logic subsystem 604, a data-holding subsystem 608, a display subsystem 612, a communication subsystem 616, and a sensor subsystem 620. Computing device 600 may optionally include other subsystems and components not shown in FIG. 6. Computing device 600 may also optionally include other user input devices such as keyboards, mice, game controllers, and/or touch screens, for example. Further, in some embodiments the methods and processes described herein may be implemented as a computer application, computer service, computer API, computer library, and/or other computer program product in a computing system that includes one or more computers.

Logic subsystem 604 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem 604 may include one or more processors that are configured to execute software instructions. Additionally or alternatively, the logic subsystem may include one or more hardware or firmware logic machines configured to execute hardware or firmware instructions. Processors of the logic subsystem may be single core or multi-core, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Data-holding subsystem 608 may include one or more physical, non-transitory devices configured to hold data and/or instructions executable by the logic subsystem 604 to implement the herein described methods and processes. When such methods and processes are implemented, the state of data-holding subsystem 608 may be transformed (e.g., to hold different data).

Data-holding subsystem 608 may include removable media and/or built-in devices. Data-holding subsystem 608 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 608 may include devices with one or more of the following characteristics: volatile, nonvolatile, dynamic, static, read/write, read-only, random access, sequential access, location addressable, file addressable, and content addressable. In some embodiments, logic subsystem 604 and data-holding subsystem 608 may be integrated into one or more common devices, such as an application specific integrated circuit or a system on a chip.

FIG. 6 also shows an aspect of the data-holding subsystem 608 in the form of removable computer-readable storage media 624, which may be used to store and/or transfer data and/or instructions executable to implement the methods and processes described herein. Removable computer-readable storage media 624 may take the form of CDs, DVDs, HD-DVDs, Blu-Ray Discs, EEPROMs, and/or floppy disks, among others.

It is to be appreciated that data-holding subsystem 608 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

Display subsystem 612 may be used to present a visual representation of data held by data-holding subsystem 608. Display subsystem 612 may include, for example, the transparent display 54 of the user HMD device 42. As the above described methods and processes change the data held by the data-holding subsystem 608, and thus transform the state of the data-holding subsystem, the state of the display subsystem 612 may likewise be transformed to visually represent changes in the underlying data. The display subsystem 612 may include one or more display devices utilizing virtually any type of technology. Such display devices may be combined with logic subsystem 604 and/or data-holding subsystem 608 in a shared enclosure, or such display devices may be peripheral display devices.

Communication subsystem 616 may be configured to communicatively couple computing device 600 with one or more networks and/or one or more other computing devices. Communication subsystem 616 may include wired and/or wireless communication devices compatible with one or more different communication protocols. As nonlimiting examples, the communication subsystem 616 may be configured for communication via a wireless telephone network, a wireless local area network, a wired local area network, a wireless wide area network, a wired wide area network, etc. In some embodiments, the communication subsystem may allow computing device 600 to send and/or receive messages to and/or from other devices via a network such as the Internet.

Sensor subsystem 620 may include one or more sensors configured to sense different physical phenomenon (e.g., visible light, infrared light, sound, acceleration, orientation, position, etc.) as described above. For example, the sensor subsystem 620 may comprise one or more eye-tracking sensors, image sensors, microphones, motion sensors such as accelerometers, touch pads, touch screens, and/or any other suitable sensors. Sensor subsystem 620 may be configured to provide observation information to logic subsystem 604, for example. As described above, observation information such as eye-tracking information, image information, audio information, ambient lighting information, depth information, position information, motion information, and/or any other suitable sensor data may be used to perform the methods and processes described above.

In some embodiments, sensor subsystem 620 may include a depth camera (e.g., outward facing sensor 212 of FIG. 2). The depth camera may include left and right cameras of a stereoscopic vision system, for example. Time-resolved images from both cameras may be registered to each other and combined to yield depth-resolved video.

In other embodiments, the depth camera may be a structured light depth camera configured to project a structured infrared illumination comprising numerous, discrete features (e.g., lines or dots) onto a scene, such as the interaction space 300 shown in FIG. 3. The depth camera may be configured to image the structured illumination reflected from the scene. Based on the spacings between adjacent features in the various regions of the imaged scene, a depth image of the scene may be constructed.

In other embodiments, the depth camera may be a time-of-flight camera configured to project a pulsed infrared illumination onto the scene. The depth camera may include two cameras configured to detect the pulsed illumination reflected from the scene. Both cameras may include an electronic shutter synchronized to the pulsed illumination. The integration times for the cameras may differ, such that a pixel-resolved time-of-flight of the pulsed illumination, from the source to the scene and then to the cameras, is discernible from the relative amounts of light received in corresponding pixels of the two cameras.

In some embodiments, sensor subsystem 620 may include a visible light camera, such as a digital camera. Virtually any type of digital camera technology may be used without departing from the scope of this disclosure. As a non-limiting example, the visible light camera may include a charge coupled device image sensor.

The term "program" may be used to describe an aspect of the multiplayer game invitation system 10 that is implemented to perform one or more particular functions. In some cases, such a program may be instantiated via logic subsystem 604 executing instructions held by data-holding subsystem 608. It is to be understood that different programs may be instantiated from the same application, service, code block, object, library, routine, API, function, etc. Likewise, the same program may be instantiated by different applications, services, code blocks, objects, routines, APIs, functions, etc. The term "program" is meant to encompass individual or groups of executable files, data files, libraries, drivers, scripts, database records, etc.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for inviting a potential player to participate in a multiplayer game with a user, the multiplayer game displayed by a display of a user head-mounted display device, comprising:
   receiving user voice data from the user;
   determining that the user voice data is an invitation to participate in the multiplayer game;
   receiving eye-tracking information, depth information, facial recognition information, potential player head-mounted display device information, and/or potential player voice data;
   associating the invitation with the potential player using the eye-tracking information, the depth information, the facial recognition information, the potential player head-mounted display device information, and/or the potential player voice data;
   matching a potential player account with the potential player;
   receiving an acceptance response from the potential player; and
   joining the potential player account with a user account associated with the user in participating in the multiplayer game.

2. The method for inviting a potential player to participate in a multiplayer game of claim 1, wherein the multiplayer game is an active multiplayer game in which the user is currently participating.

3. The method for inviting a potential player to participate in a multiplayer game of claim 1, wherein the depth information comprises a measured depth of an interaction space in which the user and the potential player are located, further comprising:
   using the depth information to select a suggested multiplayer game that is physically compatible with the measured depth of the interaction space; and
   suggesting to the user the suggested multiplayer game.

4. The method for inviting a potential player to participate in a multiplayer game of claim 1, further comprising displaying via the display of the user head-mounted display device an indicator adjacent to the potential player showing a potential player availability and/or an invitation status.

5. The method for inviting a potential player to participate in a multiplayer game of claim 1, further comprising displaying via the display of the user head-mounted display device potential player profile information.

6. The method for inviting a potential player to participate in a multiplayer game of claim 5, wherein the potential player profile information includes a name, a user ID, a game achievement level, and/or game interests.

7. The method for inviting a potential player to participate in a multiplayer game of claim 1, further comprising matching the potential player account with the potential player using the facial recognition information, the potential player head-mounted display device information, and/or the potential player voice data.

8. The method for inviting a potential player to participate in a multiplayer game of claim 1, wherein the acceptance response comprises the potential player voice data and/or a gesture performed by the potential player.

9. The method for inviting a potential player to participate in a multiplayer game of claim 1, further comprising:
   determining that the user voice data is a command to exit the multiplayer game; and
   removing the user account from participation in the multiplayer game.

10. A multiplayer game invitation system including a user head-mounted display device having a display, the user head-mounted display device operatively connected to a computing device, the multiplayer game invitation system comprising:
   a potential player invitation program executed by a processor of the computing device, the potential player invitation program configured to:
   receive user voice data from a user;
   determine that the user voice data is an invitation to participate in a multiplayer game;
   receive eye-tracking information, depth information, facial recognition information, potential player head-mounted display device information, and/or potential player voice data;
   associate the invitation with a potential player using the eye-tracking information, the depth information, the facial recognition information, the potential player head-mounted display device information, and/or the potential player voice data;
   match a potential player account with the potential player;
   receive an acceptance response from the potential player; and join the potential player account with a user account associated with the user in participating in the multiplayer game.

11. The multiplayer game invitation system of claim 10, wherein the potential player invitation program is further configured to display via the display of the user head-mounted display device a list of one or more multiplayer games available to the user and the potential player.

12. The multiplayer game invitation system of claim 10, wherein the depth information comprises a measured depth of an interaction space in which the user and the potential player are located, and the potential player invitation program is further configured to:
   use the depth information to select a suggested multiplayer game that is physically compatible with the measured depth of the interaction space; and
   suggest to the user the suggested multiplayer game.

13. The multiplayer game invitation system of claim 10, wherein the potential player invitation program is further configured to display via the display of the user head-mounted display device an indicator adjacent to the potential player showing a potential player availability and/or an invitation status.

14. The multiplayer game invitation system of claim 10, wherein the potential player invitation program is further configured to display via the display of the user head-mounted display device potential player profile information.

15. The multiplayer game invitation system of claim 10, wherein the potential player invitation program is further configured to:
   display via the display of the user head-mounted display device an image corresponding to an active multiplayer game in which a currently-participating potential player is participating;
   determine that the user voice data is a request to join in participating in the active multiplayer game;
   receive the acceptance response from the currently-participating potential player; and
   join the user account with a currently-participating potential player account in participating in the active multiplayer game.

16. The multiplayer game invitation system of claim 10, wherein the potential player invitation program is further configured to match the potential player account with the potential player using the facial recognition information, the potential player head-mounted display device information, and/or the potential player voice data.

17. The multiplayer game invitation system of claim 10, wherein the acceptance response comprises the potential player voice data and/or a gesture performed by the potential player.

18. The multiplayer game invitation system of claim 10, wherein the potential player invitation program is further configured to:
   determine that the user voice data is a command to exit the multiplayer game; and
   remove the user account from participation in the multiplayer game.

19. A computer-readable storage medium comprising instructions stored thereon and executable by a computing device to enable a user to invite a potential player to participate in a multiplayer game with the user, the instructions being executable to:
   receive user voice data from the user;
   determine that the user voice data is an invitation to participate in a multiplayer game;
   receive eye-tracking information, depth information, facial recognition information, potential player head-mounted display device information, and/or potential player voice data;
   associate the invitation with the potential player using the eye-tracking information, the depth information, the facial recognition information, the potential player head-mounted display device information, and/or the potential player voice data;
   match a potential player account with the potential player;
   receive an acceptance response from the potential player; and
   join the potential player account with a user account associated with the user in participating in the multiplayer game.

20. The computer-readable storage medium of claim 19, wherein the depth information comprises a measured depth in an interaction space in which the user and the potential player are located, and the instructions are executable by the computing device to:
   use the depth information to select a suggested multiplayer game that is physically compatible with the measured depth of the interaction space; and
   suggest to the user the suggested multiplayer game.

* * * * *